(12) United States Patent
Tang (10) Patent No.: US 11,533,706 B2
(45) Date of Patent: Dec. 20, 2022

(54) METHOD FOR PAGING, AND ACCESS NETWORK DEVICE, TERMINAL DEVICE AND CORE NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/635,741

(22) PCT Filed: Aug. 18, 2017

(86) PCT No.: PCT/CN2017/098095
§ 371 (c)(1),
(2) Date: Jan. 31, 2020

(87) PCT Pub. No.: WO2019/033402
PCT Pub. Date: Feb. 21, 2019

(65) Prior Publication Data
US 2020/0229134 A1 Jul. 16, 2020

(51) Int. Cl.
*H04W 68/02* (2009.01)
*H04W 4/029* (2018.01)
(Continued)

(52) U.S. Cl.
CPC .......... *H04W 68/02* (2013.01); *H04W 4/029* (2018.02); *H04W 60/00* (2013.01); *H04W 68/005* (2013.01); *H04W 76/27* (2018.02)

(58) Field of Classification Search
CPC ... H04W 68/00; H04W 68/02; H04W 68/005; H04W 68/10; H04W 68/06; H04W 68/12;
(Continued)

(56) References Cited

U.S. PATENT DOCUMENTS 9,560,625 B2 * 1/2017 Chen et al. ......... H04W 64/003
2010/0220680 A1 * 9/2010 Ramankutty et al. ........ 370/329
(Continued)

FOREIGN PATENT DOCUMENTS

| CL | 202000351 | 6/2020 |
| CL | 202000352 | 6/2020 |

(Continued)

OTHER PUBLICATIONS

3GPP TSG-RAN WG2 #99; Tdoc R2-1707845; Berlin, Germany, Aug. 21-25, 2017.
(Continued)

*Primary Examiner* — Meless N Zewdu
(74) *Attorney, Agent, or Firm* — Young Basile Hanlon & MacFarlane, P.C.

(57) ABSTRACT

Disclosed are a method for paging, and an access network device, a terminal device and a core network device. The method comprises: a first access network device acquiring a tracking area list of a terminal device; and the first access network device determining, according to the tracking area list, a target paging area of the first access network device initiating paging to the terminal device.

4 Claims, 6 Drawing Sheets

(51) Int. Cl.
*H04W 76/27* (2018.01)
*H04W 60/00* (2009.01)
*H04W 68/00* (2009.01)

(58) Field of Classification Search
CPC ... H04W 68/04; H04W 64/00; H04W 64/003; H04W 88/00; H04W 88/08; H04W 84/027; H04W 84/02; H04W 88/185; H04W 36/00835; H04W 4/029; H04W 4/025; H04W 4/02; H04W 4/021; H04W 4/022; H04W 4/023; H04W 4/024; H04W 76/27; H04W 60/00; H04Q 2213/13374; H04Q 2213/374

See application file for complete search history.

(56) References Cited

U.S. PATENT DOCUMENTS

| | | | | |
|---|---|---|---|---|
| 2012/0115515 | A1* | 5/2012 | Lopez et al. | 455/458 |
| 2013/0337797 | A1* | 12/2013 | Ban et al. | H04W 84/00 |
| 2014/0256319 | A1* | 9/2014 | Lee | H04W 68/00 |
| 2014/0349688 | A1* | 11/2014 | Liu et al. | H04W 68/02 |
| 2014/0362756 | A1* | 12/2014 | Maeda et al. | H04W 65/4076 |
| 2015/0146566 | A1* | 3/2015 | Guan et al. | H04W 24/02 |
| 2016/0057730 | A1 | 2/2016 | Truelove et al. | |
| 2016/0128020 | A1* | 5/2016 | Agarwal et al. | H04W 68/12 |
| 2017/0245240 | A1 | 8/2017 | Kim et al. | |
| 2018/0103429 | A1* | 4/2018 | Chou | H04W 52/0229 |
| 2018/0206207 | A1* | 7/2018 | Yu et al. | H04W 68/02 |
| 2019/0082148 | A1* | 3/2019 | Zee et al. | H04W 68/02 |
| 2019/0082417 | A1* | 3/2019 | Bolle et al. | H04W 68/02 |
| 2019/0159168 | A1* | 5/2019 | Wang et al. | H04W 68/02 |
| 2019/0199802 | A1* | 6/2019 | Zhu et al. | H04L 67/14 |

FOREIGN PATENT DOCUMENTS

| | | | | |
|---|---|---|---|---|
| CN | 101998633 | A | | 3/2011 |
| CN | 102342133 | A | | 2/2012 |
| CN | 104581947 | A | | 4/2015 |
| CN | 107018497 | A | | 8/2017 |
| CN | 107872877 | A | * | 4/2018 ............ H04W 68/02 |
| CN | 110636608 | A | | 12/2019 |
| CN | 112087795 | A | | 12/2020 |
| JP | 2012514916 | A | | 6/2012 |
| JP | 2016521058 | A | | 7/2016 |
| RU | 2481743 | C2 | | 5/2013 |
| WO | 2005086379 | A1 | | 9/2005 |
| WO | 2016116157 | A1 | | 7/2016 |
| WO | 2017018838 | A1 | | 2/2017 |

OTHER PUBLICATIONS

3GPP TSG-RAN WG3 Meeting #93bis; R3-162432; Sophia Antipolis, France, Oct. 10-14, 2016.
SA WG2 Meeting #122 bis; S2-175556; Aug. 21-25, 2017, Sophia Antipolis, France.
SA WG2 Meeting #122bis; S2-175677; Aug. 21-25, 2017, Sofia Antipolis, France.
Extended European Search Report for EP Application 17921865.6 dated Aug. 17, 2020.
Russia First Office Action with English Translation for RU Application 2020104447/07(006930) dated Aug. 19, 2020.
3GPP TSG-RAN WG2 Meeting #95bis; Kaohsiung, Oct. 10-14, 2016; R2-166629.
3GPP TR 23.799 V 14.0.0 (Dec. 2016); 3rd Generation Partnership Project; Technical Specification Group Services and System Aspects; Study on Architecture for Next Generation System (Release 14).
3GPP TSG-RAN Working Group 2 meeting #96; Reno, Nevada, US, Nov. 14-18, 2016; R2-167401.
3GPP TSG-RAN WG2 Meeting #95; Goteborg, Sweden, Aug. 22-26, 2016; R2-165303.
European Examination Report for EP Application 17921865.6 dated Mar. 23, 2021. (6 pages).
Korea First Office Action with English translation for KR Application 10-2020-7003586 dated Mar. 26, 2021. (9 pages).
Canada First Office Action for CA Application 3,071,008 dated Mar. 12, 2021. (5 pages).
China First Office Action with English Translation for CN Application 202010081159.6 dated Apr. 19, 2021. (20 pages).
Study on Architecture for Next Generation System (Release 14), 3GPP TR 23.799 V14.0 0 published Dec. 2016. (522 pages).
Chile Office Action with English Translation for CL Application 2020-000354 dated Jun. 17, 2021. (19 pages).
Chinese Second Office Action with English Translation for CN Application 202010081159.6 dated Jul. 13, 2021. (10 pages).
Indian Examination Report for IN Application 202017003398 dated May 14, 2021. (6 pages).
Japanese Office Action with English Translation for JP Application 2020-506951 dated Aug. 3, 2021. (11 pages).
Intel Corporation, Mobility support for lightly connected UE, 3GPP TSG RAN WG2 Meeting #95, R2-164987, Aug. 22-26, 2016. (5 pages).
Nokia, Alcatel-Lucent Shanghai Bell, Paging and location tracking in RRC_INACTIVE, 3GPP TSG-RAN WG2 Meeting #96, R2-167708, Nov. 14-18, 2016. (5 pages).
Huawei, HiSilicon, Discussion on CN location Update and RNA Update for inactive state, 3GPP TSG-RAN WG2#99 Meeting, R2-1708712, Aug. 21-25, 2017. (5 pages).
OPPO, Discussion on Assistance Information for RAN Notification Area Decision, 3GPP TSG-RAN2#99bis, R2-1710233, Oct. 9-13, 2017. (3 pages).
LG Electronics Inc., Discussion on functionality in RRC-INACTIVE state, 3GPP TSG-RAN WG3 Meeting #96, R3-171500, May 15-19, 2017. (9 pages).
Chile Office Action with English Translation for CL Application 2020000354 dated Oct. 15, 2021. (12 pages).
Chinese Third Office Action with English Translation for CN Application 202010081159.6 dated Sep. 18, 2021. (11 pages).
Communication pursuant to Article 94(3) EPC for EP Application 17921865.6 dated Oct. 13, 2021. (6 pages).
Korean Office Action with English Translation for KR Application 1020207003586 dated Sep. 29, 2021. (6 pages).
Singapore Invitation to Respond to Written Opinion for SG Application 11202000651T dated Aug. 11, 2021. (6 pages).
3GPP TS 36.413 V14.3.0, Evolved Universal Terrestrial Radio Access Network (E-UTRAN), S1 Application Protocol (S1AP), (Jun. 2017).
3GPP TR 23.799 V14.0.0 (Dec. 2016), Study on Architecture for Next Generation System (Release 14), 522 pages.
Taiwan Office Action with English Translation for TW Application 107128887 dated Dec. 23, 2021. (22 pages).
Canadian Examination Report for CA Application 3071008 dated Nov. 5, 2021. (4 pages).
Communication pursuant to Article 94(3) EPC for EP Application 17921865.6 dated May 18, 2022. (6 pages).
Japanese Office Action with English Translation for JP Application 2020506951 dated Mar. 16, 2022. (8 pages).
Indonesia Office Action with English Translation for ID Application P00202001531 dated Oct. 10, 2022. (5 pages).
Canadian Examination Report for CA Application 3071008 dated Aug. 11, 2022. (4 pages).
Singapore Second Written Opinion for SG Application 11202000651T dated Sep. 13, 2022. (7 pages).

* cited by examiner

210 A terminal device obtains a tracking area list of the terminal device

220 The terminal device sends the tracking area list to a first access network device, so that the first access network device determines a target paging area for the first access network device to initiate paging to the terminal device

310 A core network device obtains a tracking area list of a terminal device

320 The core network device sends the tracking area list to a first access network device, so that the first access network device determines a target paging area for the first access network device to initiate paging to the terminal device

FIG. 5

Access Network Device 400

Obtaining Unit 410

Determining Unit 420

METHOD FOR PAGING, AND ACCESS NETWORK DEVICE, TERMINAL DEVICE AND CORE NETWORK DEVICE

CROSS-REFERENCE TO RELATED APPLICATION(S)

This application is a 371 application of International Application No. PCT/CN2017/098095, filed on Aug. 18, 2017, the entire disclosure of which is hereby incorporated by reference.

TECHNICAL FIELD

Implementations of the present disclosure relate to the field of communication, and more specifically, to a method for paging, an access network device, a terminal device, and a core network device.

BACKGROUND

Paging is a signaling process performed when a network searches for a terminal. A called party in the network has to respond to the paging to communicate normally. In a fifth generation (5G) system, when downlink data of the terminal arrives, paging can be initiated by a Radio Access Network (RAN) to the terminal. Therefore, there is an urgent need for a method to enable the RAN to initiate paging to the terminal in a suitable paging area.

SUMMARY

In view of the above, implementations of the present disclosure provide a method for paging, an access network device, a terminal device and a core network device.

In a first aspect, a method for paging is provided, including: obtaining, by a first access network device, a tracking area list of a terminal device; and determining, by the first access network device according to the tracking area list, a target paging area for the first access network device to initiate paging to the terminal device.

In a possible implementation, the method further includes: initiating, by the first access network device, paging to the terminal device within the target paging area, when there exists downlink data of the terminal device which needs to be sent.

Optionally, RAN paging may be triggered by a change of a system message of a cell.

In a possible implementation, the initiating, by the first access network device, paging to the terminal device within the target paging area, when there exists downlink data of the terminal device which needs to be sent, includes: initiating, by the first access network device, paging to the terminal device within the target paging area, when the terminal device is in a Radio Resource Control (RRC) inactive state and there exists downlink data which needs to be sent.

Optionally, paging of the terminal device in an RRC idle state may be initiated by a RAN.

In a possible implementation, the obtaining, by the first access network device, the tracking area list of the terminal device, includes: receiving, by the first access network device, the tracking area list sent by the terminal device and/or the core network device.

In a possible implementation, before the receiving, by the first access network device, the tracking area list sent by the terminal device and/or the core network device, the method further includes: sending, by the first access network device, a request for obtaining the tracking area list to the terminal device and/or the core network device.

In a possible implementation, the first access network device receives the tracking area list sent by the terminal device, including: the first access network device receives the tracking area list obtained by the terminal device, once the terminal device performs tracking area update or an attachment process.

In a possible implementation, the first access network device receives the tracking area list sent by the terminal device, including: receiving, by the first access network device, the tracking area list obtained by the terminal device through RRC signaling.

Optionally, the terminal device may also send the TA list of the terminal device to the access network device through MAC signaling, or DCI signaling, etc.

In a possible implementation, the obtaining, by the first access network device, the tracking area list of the terminal device, includes: receiving, by the first access network device, the tracking area list sent by a second access network device, when the access network device which provides a network service for the terminal device switches from the second access network device to the first access network device.

In a possible implementation, the tracking area list is carried in context information of the terminal device.

In a possible implementation, the method further includes: sending, by the first access network device, information of the target paging area to the terminal device so that the terminal device triggers the first access network device to reconfigure a paging area for the terminal device when the terminal device determines to move out of the target paging area.

In a second aspect, a method for paging is provided, including: obtaining, by a terminal device, a tracking area list of the terminal device; and sending, by the terminal device, the tracking area list to a first access network device so that the first access network device determines a target paging area for the first access network device to initiate paging to the terminal device.

In a possible implementation, the obtaining, by a terminal device, a tracking area list of the terminal device, includes: obtaining, by the terminal device, the tracking area list during tracking area update or an attaching process.

In a possible implementation, before sending, by the terminal device, the tracking area list of the terminal device to the first access network device, the method further includes: receiving, by the terminal device, a request for obtaining the tracking area list sent by the first access network device.

In a possible implementation, the sending, by the terminal device, the tracking area list to the first access network device, includes: sending, by the terminal device, the tracking area list to the first access network device, once the terminal device obtains the tracking area list.

In a possible implementation, the sending, by the terminal device, the tracking area list to the first access network device, includes: sending, by the terminal device, the tracking area list to the first access network device through Radio Resource Control (RRC) signaling.

In a possible implementation, the method further includes: receiving, by the terminal device, a paging message sent by the first access network device, when the terminal device is in an RRC inactive state, wherein the paging message is used for indicating that there exists downlink data of the terminal device which needs to be sent.

In a possible implementation, the method further includes: receiving, by the terminal device, information of the target paging area sent by the first access network device; and triggering, by the terminal device according to the information of the target paging area, the first access network device to reassign a paging area to the terminal device.

In a third aspect, a method for paging is provided, including: obtaining, by a core network device, a tracking area list of a terminal device; and sending, by the core network device, the tracking area list to a first access network device, so that the first access network device determines a target paging area for the first access network device to initiate paging to the terminal device.

In a possible implementation, before sending, by the core network device, the tracking area list to the first access network device, the method further includes: receiving, by the core network device, information for obtaining the tracking area list sent by the first access network device.

In a fourth aspect, an access network device is provided, which is configured to perform the method in the above first aspect or any possible implementation of the first aspect. Specifically, the access network device includes units configured to perform the method in the above first aspect or any possible implementation of the first aspect.

In a fifth aspect, a terminal device is provided, which is configured to perform the method in the above second aspect or any possible implementation of the second aspect. Specifically, the terminal device includes units for performing the method in the above second aspect or any possible implementation of the second aspect.

In a sixth aspect, a core network device is provided, which is configured to perform the method in the above third aspect or any possible implementation of the third aspect. Specifically, the core network device includes units configured to perform the method in the above third aspect or any possible implementation of the third aspect.

In a seventh aspect, an access network device is provided, including a memory, a processor, an input interface, and an output interface. The memory, the processor, the input interface and the output interface are connected through a bus system. The memory is configured to store instructions, and the processor is configured to execute the instructions stored in the memory to perform the method in the first aspect or any possible implementation of the above first aspect.

In an eighth aspect, a terminal device is provided, including a memory, a processor, an input interface, and an output interface. The memory, the processor, the input interface and the output interface are connected through a bus system. The memory is configured to store instructions, and the processor is configured to execute the instructions stored in the memory to perform the method in the second aspect or any possible implementation of the above second aspect.

In a ninth aspect, a core network device is provided, including a memory, a processor, an input interface, and an output interface. The memory, the processor, the input interface and the output interface are connected through a bus system. The memory is configured to store instructions, and the processor is configured to execute the instructions stored in the memory to execute the method in the above third aspect or any possible implementation of the third aspect.

In a tenth aspect, a computer storage medium is provided, which is configured to store computer software instructions for executing the method in the above first aspect or any possible implementation of the first aspect, or the method in the above second aspect or any possible implementation of the second aspect, or the method in the above third aspect or any possible implementation of the third aspect, wherein the computer software instructions contain programs designed for executing each of the above aspects.

In an eleven aspect, a computer program product containing instructions is provided, wherein when the instructions are run on a computer, the computer is caused to perform the method in the above first aspect or any optional implementation of the first aspect, or the method in the above second aspect or any optional implementation of the second aspect, or the method in the above third aspect or any optional implementation of the third aspect.

These aspects and other aspects of the present disclosure will be more simply understood in following description of the implementations.

DETAILED DESCRIPTION

Technical schemes in implementations of the present disclosure will be clearly and completely described below with reference to the drawings in the implementations of the present disclosure.

It should be understood that technical solutions of implementations of the present disclosure may be applied to various communication systems, such as, a Global System of Mobile communication (GSM) system, a Code Division Multiple Access (CDMA) system, a Wideband Code Division Multiple Access (WCDMA) system, General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, New Radio (NR) or a future 5G system, etc.

In particular, technical solutions of implementations of the present invention may be applied to various communication systems based on non-orthogonal multiple access technologies, such as a Sparse Code Multiple Access (SCMA) system, and a Low Density Signature (LDS) system, etc. Of course, the SCMA system and the LDS system may also be referred to as other names in the field of communication. Further, technical solutions of implementations of the present invention may be applied to multi-carrier transmission systems employing non-orthogonal multiple access technologies, such as an Orthogonal Frequency Division Multiplexing (OFDM) system based on the non-orthogonal multiple access technology, a Filter Bank Multi-Carrier (FBMC) system, a Generalized Frequency Division Multiplexing (GFDM) system, or a Filtered OFDM (F-OFDM) system, etc.

A terminal device in implementations of the present disclosure may refer to a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus. An access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, an on-board device, a wearable device, a terminal device in a future 5G network, or a terminal device in a future evolved Public Land Mobile Network (PLMN), etc., which is not restricted in implementations of the present invention.

An access network device in implementations of the present disclosure may be a device for communicating with a terminal device. The network device may be a Base Transceiver Station (BTS) in GSM or CDMA, or a NodeB (NB) in a WCDMA system, or an Evolutional NodeB (eNB or eNodeB) in an LTE system, or a wireless controller in a scenario of a Cloud Radio Access Network (CRAN), or the network device may be a relay station, an access point, an on-board device, a wearable device, or a network device in the future 5G network or a network device in the future evolved PLMN network, etc., which is not restricted in implementations of the present disclosure.

The core network device in implementation of the present disclosure may be a Mobility Management Entity (MME), a Serving Gateway (S-GW), or a Packet Data Network Gateway (P-GW), etc., which is not restricted in implementations of the present disclosure.

Figure 1:
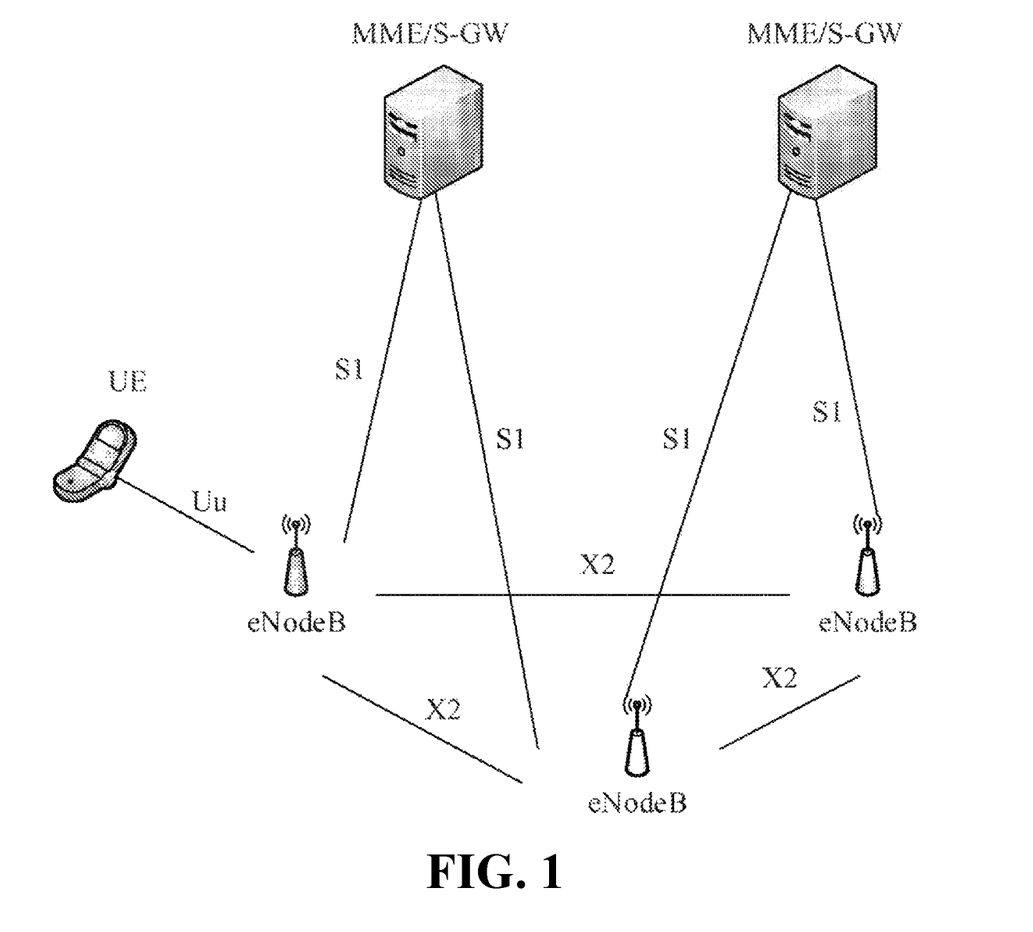
FIG. 1 shows a schematic diagram of an application scenario according to an implementation of the present disclosure.

FIG. 1 is a schematic diagram of an application scenario according to an implementation of the present disclosure. As shown in FIG. 1, a system architecture of LTE is divided into two parts, which includes MME/S-GW and eNodeB. The eNodeB and a UE are connected through a Uu interface to provide a protocol termination point to a control plane and a user plane of the UE. The eNodeBs are connected through an X2 interface, and there always exists an X2 interface between two different eNodeBs which need to communicate. An LTE access network and a core network are connected through an S1 interface, wherein the S1 interface supports a multiple-multiple contact mode.

Generally, a main purpose of paging is to establish a signaling connection from a UE to an Evolved Packet Core (EPC) so as to perform subsequent signaling or data transmission. In the 5G system, when downlink data of a terminal device arrives, the terminal device may be paged through a Core Network (CN) or a RAN.

Figure 2:
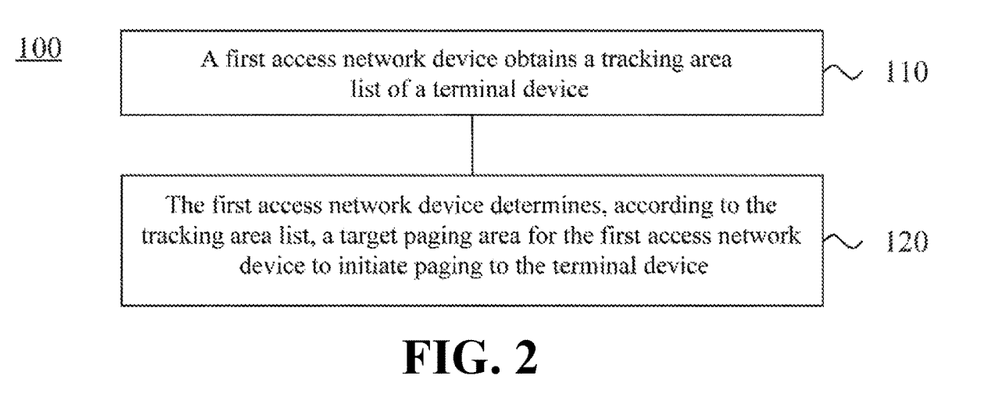
FIG. 2 shows a schematic block diagram of a method for paging according to an implementation of the present disclosure.

FIG. 2 shows a schematic block diagram of a method 100 for paging according to an implementation of the present disclosure. As shown in FIG. 2, the method 100 includes part or all of the following contents.

S110, a first access network device obtains a tracking area list of a terminal device.

S120, the first access network device determines, according to the tracking area list, a target paging area for the first access network device to initiate paging to the terminal device.

The so-called Tracking Area (TA) is a concept set up for location management of terminals in a communication system. Multiple TAs form a TA list and are simultaneously allocated to a terminal. When the terminal moves in the TAs of the TA list, TA update need not to be performed to reduce frequent interactions with a network. When a UE enters a new TA which is not in the TA List registered by the UE, TA update needs to be performed. The core network reassigns a TA list to the terminal. The newly assigned TA list may also contain some TAs in the original TA list. When the terminal is in an idle state, the core network can know the tracking area in which the terminal is located, and meanwhile, when the terminal in the idle state needs to be paged, the core network must perform paging in all cells of the tracking area registered by the terminal, that is, all cells in the TA list of the terminal.

For RAN paging, the access network device should first determine a paging area for the terminal device. When the terminal device moves within the paging area, the terminal device may directly perform cell reselection within the paging area without notifying the network side. When the terminal device moves out of the paging area, the terminal device needs to trigger the access network device to reconfigure a new paging area for the terminal device. Specifically, the access network device may refer to the TA list of the terminal device, that is, the access network device may select a suitable paging area for the terminal device within a control area scope of the core network.

Therefore, in the method for paging according to the implementation of the present disclosure, the access network device may determine a suitable paging area for RAN paging by referring to the TA list of the terminal device, so that it is beneficial to reducing signaling overhead.

Optionally, in the implementation of the present disclosure, the method further includes: the first access network device initiates paging to the terminal device within the target paging area, when there exists downlink data of the terminal device which needs to be sent.

Those skilled in the art will understand that paging may be triggered by data, or a change of a system message of a cell, etc. However, the paging usually mentioned by us mainly refers to paging triggered by the data. Specifically, when the access network device knows that there exists downlink data which is to be transmitted, the access network device may directly initiate paging to a corresponding terminal device within a determined target paging area. For example, when downlink data arrives at the access network device, the access network device may send a paging message to the corresponding terminal device, wherein an identification of the terminal device may be carried in the paging message. For another example, when downlink data arrives at the core network device, the core network device temporarily does not send the downlink data to the access network device first, but may send indication information to the access network device to indicate that there exists downlink data of the terminal device which needs to be transmitted, and the access network device may send a paging message to the terminal device after receiving the indication information. The implementation of the application does not limit conditions for triggering the access network device to initiate paging.

Optionally, in the implementation of the present disclosure, the first access network device initiates paging to the terminal device within the target paging area, when there exists the downlink data of the terminal device which needs to be sent, includes: the first access network device initiates paging to the terminal device within the target paging area, when the terminal device is in a Radio Resource Control (RRC) inactive state and there exists the downlink data which needs to be sent.

Figure 3:
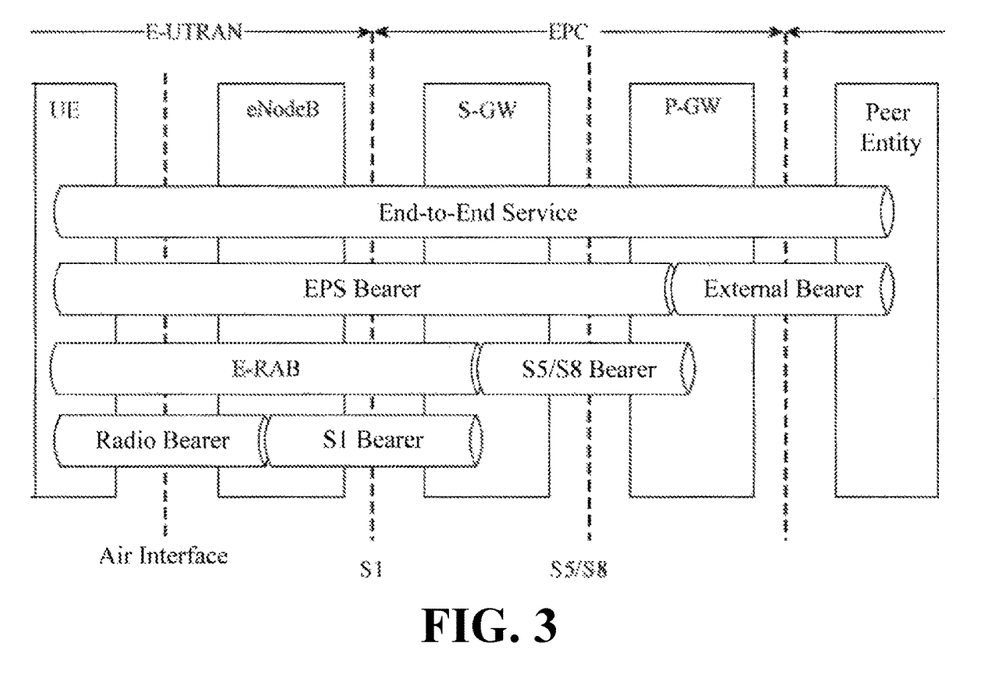
FIG. 3 shows a schematic block diagram of architecture of EPS bearer services.

In order to facilitate the understanding of implementations of the present disclosure, first of all, some elements in architecture of Evolved Packet System (EPS) bearer services will be briefly described with reference to FIG. 3. As shown in FIG. 3, the network architecture mainly includes Evolved-Universal Mobile Telecommunication System Terrestrial Radio Access Network (E-UTRAN) and the Evolved Packet Core (EPC). In the EPS bearer service architecture system, an end-to-end service may be divided into two parts: an EPS bearer and an external bearer. Herein, an Evolved Radio Access Bearer (E-RAB) is used for transmitting a packet of an EPS bearer between a UE and the evolved EPC, wherein there is a one-to-one correspondence between the E-RAB and the EPS bearer. A radio bearer is used for transmitting a packet of an E-RAB bearer between the UE and an eNodeB, wherein there is a one-to-one correspondence between the radio bearer and E-RAB/EPS bearer. An S1 bearer is used for transmitting a packet of an E-RAB bearer between the eNodeB and an S-GW. An S5/S8 bearer is used for transmitting a packet of an EPS bearer between the S-GW and a P-GW.

In the LTE system, RRC states of the UE mainly include an RRC idle state and an RRC connected state. In the RRC idle state, there exists S5/S8 bearer, but there is no radio bearer or S1 bearer, the core network side keeps a UE context, the eNodeB and the UE do not keep the context of each other, and the terminal keeps a unique identification (usually Temporary Mobile Subscriber Identity (TMSI)) within a Time Advance (TA). The UE in the RRC idle state cannot have behaviors such as data interchange with the network, a Discontinuous Reception (DRX) process configured by a Non-access stratum (NAS), system information broadcasting and paging, neighbor cell measurement, mobility of cell reselection, or reporting without any measurement report, or the like. In the RRC connected state, there exists an S5/S8 bearer, an S1 bearer and a radio bearer, the core network, the eNodeB and the UE all keep the corresponding context, and the eNodeB assigns an access stratum (AS) identification (usually Cell Radio Network Temporary Identifier (C-RNTI)). The UE in the RRC connected state may interchange data with the network and there may exist behaviors such as DRX configured by the AS, mobility of handover, or reporting channel measurement to the network side, or the like.

In the 5G system, a third state, i.e., an RRC inactive state, is introduced. In the RRC inactive State, there exists an S5/S8 bearer, an S1 bearer and partial radio bearer, the core network, the eNodeB and the UE all keep the corresponding context, and the eNodeB assigns an access stratum (AS) identification (usually a Resume identification (ID)). The UE in the RRC inactive state has the mobility of the cell reselection, no measurement report, may perform sending and receiving of small data, and there may exist the DRX configured by the AS.

In general, paging of the terminal device in the RRC idle state may be initiated by the CN, and the paging area is also configured by the CN; while paging of the terminal device in the RRC inactive state may be initiated by the RAN, and the paging area may be configured by the RAN. However, implementations of the present disclosure are not limited to this. For example, paging of the terminal device in the RRC idle state may also be initiated by the RAN.

Optionally, in the implementation of the present disclosure, the first access network device obtains the tracking area list of the terminal device, includes: the first access network device receives the tracking area list sent by the terminal device and/or the core network device.

As mentioned above, the terminal device itself may store the TA list of its own, and the core network device may also know the TA list of the terminal device, so the terminal device and/or the core network device may send the TA list of the terminal device to the access network device. That is, the access network device may obtain the TA list of the terminal device from the terminal device and/or the core network device.

Optionally, the terminal device may send the TA List of the terminal device to the access network device through at least one of the following signaling: RRC signaling, Media Access Control (MAC) signaling and Downlink Control Information (DCI), etc.

Optionally, in the implementation of the present disclosure, before the first access network device receives the tracking area list sent by the terminal device and/or the core network device, the method further includes: the first access network device sends a request for obtaining the tracking area list to the terminal device and/or the core network device.

For example, the access network device may request the terminal device and/or the core network device to obtain the TA list of the terminal device, when the terminal device is in the RRC connected state. The access network device may also request the core network device to obtain the TA list of the terminal device, when the terminal device is in the RRC inactive state. For another example, the access network device may also request the terminal device and/or the core network device to obtain the TA list of the terminal device, only when paging the terminal device is needed. Implementations of the present disclosure do not restrict when the access network device specifically requests the terminal device and/or the core network device for the TA list of the terminal device.

Optionally, in the implementation of the present disclosure, the first access network device receives the tracking area list sent by the terminal device, includes: the first access network device receives the tracking area list obtained by the terminal device, once the terminal device performs tracking area update or an attachment process.

Generally, the terminal device obtains the TA list of the terminal device through the attachment process or the TA Update (TAU). The terminal device may actively send the TA list to the access network device, when obtaining the TA list of the terminal device. That is to say, the terminal device may be triggered by the attachment process or the TAU process to send the TA list to the access network device with no need of the access network device to ask the terminal device for the TA list.

Optionally, the terminal device may not actively send the TA list of the terminal device when obtaining the TA list of the terminal device through the attachment process or the TAU process, but may only send the TA list obtained by the terminal device to the access network device after the access network device asks the terminal device for the TA list obtained by the terminal device.

Optionally, in the implementation of the present disclosure, the first access network device obtains the tracking area list of the terminal device, includes: the first access network device receives the tracking area list sent by a second access network device, when the access network device which provides a network service for the terminal device switches from the second access network device to the first access network device.

When the terminal device moves from a source cell to a target cell, the access network device of the source cell may send the TA list of the terminal device to an access network device of the target cell. The access network device of the target cell may also directly obtain the TA list of the terminal device from the terminal device or the core network device with no need of obtaining the TA list of the terminal device from the access network device of the source cell. Specifically, the access network device of the target cell may ask any of the terminal device, the access network device of the source cell and the core network device for the TA list of the terminal device.

Optionally, any of the terminal device, the access network device of the source cell and the core network device may send the TA list of the terminal device as a context of the terminal device to the access network device of the target cell.

Optionally, in the implementation of the present disclosure, the method further includes: the first access network device sends information of the target paging area to the terminal device so that the terminal device triggers the first access network device to reconfigure a paging area for the terminal device when the terminal device determines to move out of the target paging area.

As mentioned above, the terminal device may judge whether the terminal device is within a scope of the paging area according to information of the paging area configured by the access network device. If the terminal device is within the scope, the terminal device may directly perform cell handover without notifying the access network device. If the terminal device is not within the scope, the terminal device needs to notify the access network device so that the access network device can reconfigure a new paging area for the terminal device.

Figure 4:
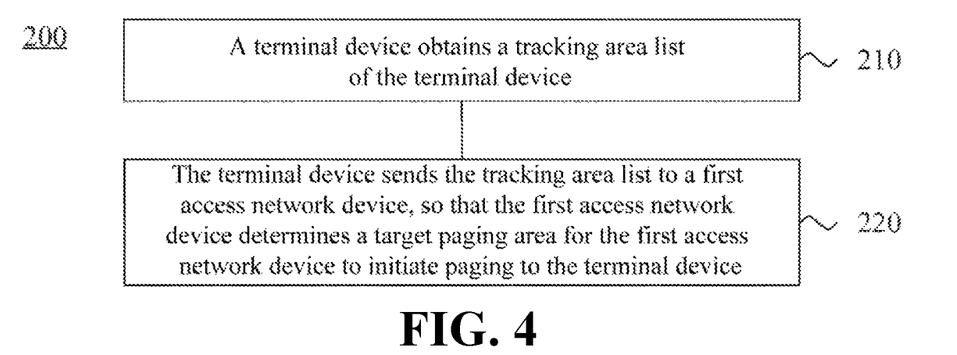
FIG. 4 shows another schematic block diagram of a method for paging according to an implementation of the present disclosure.

FIG. 4 shows a schematic block diagram of a method 200 for paging according to an implementation of the present disclosure. As shown in FIG. 4, the method 200 includes part or all of the following contents.

S210, a terminal device obtains a tracking area list of the terminal device.

S220, the terminal device sends the tracking area list to a first access network device, so that the first access network device determines a target paging area for the first access network device to initiate paging to the terminal device.

Therefore, in the method for paging according to the implementation of the present disclosure, the terminal device enables the access network device to determine a suitable paging area for RAN paging by reporting the TA list, so that it is beneficial to reducing signaling overhead.

Optionally, in the implementation of the present disclosure, the terminal device obtains the tracking area list of the terminal device, includes: the terminal device obtains tracking area list during tracking area update or an attaching process.

Optionally, in the implementation of the present disclosure, before the terminal device sends the tracking area list of the terminal device to the first access network device, the method further includes: the terminal device receives a request for obtaining the tracking area list sent by the first access network device.

Optionally, in the implementation of the present disclosure, the terminal device sends the tracking area list to the first access network device, includes: the terminal device sends the tracking area list to the first access network device, once the terminal device obtains the tracking area list.

Optionally, in the implementation of the present disclosure, the terminal device sends the tracking area list to the first access network device, includes: the terminal device sends the tracking area list to the first access network device through Radio Resource Control (RRC) signaling.

Optionally, in the implementation of the present disclosure, the method further includes: the terminal device receives a paging message sent by the first access network device, when the terminal device is in an RRC inactive state, wherein the paging message is used for indicating that there exists downlink data of the terminal device which needs to be sent.

Optionally, in the implementation of the present disclosure, the method further includes: the terminal device receives information of the target paging area sent by the first access network device; and the terminal device triggers, according to the information of the target paging area, the first access network device to reassign a paging area to the terminal device.

It should be understood that the interaction between the terminal device and the access network device and the related characteristics, functions, or the like described for the terminal device correspond to the related characteristics and functions of the access network device. That is to say, what information the terminal device sends to the access network device is what information the access network device receives accordingly. For sake of conciseness, the specific description will not be repeated here.

It should be understood that in various implementations of the present invention, values of sequence numbers in the aforementioned processes do not indicate an order of execution, and the order of execution of various processes should be determined by their functions and internal logics, and should not constitute any limitation on implementation processes of implementations of the present disclosure.

Figure 5:
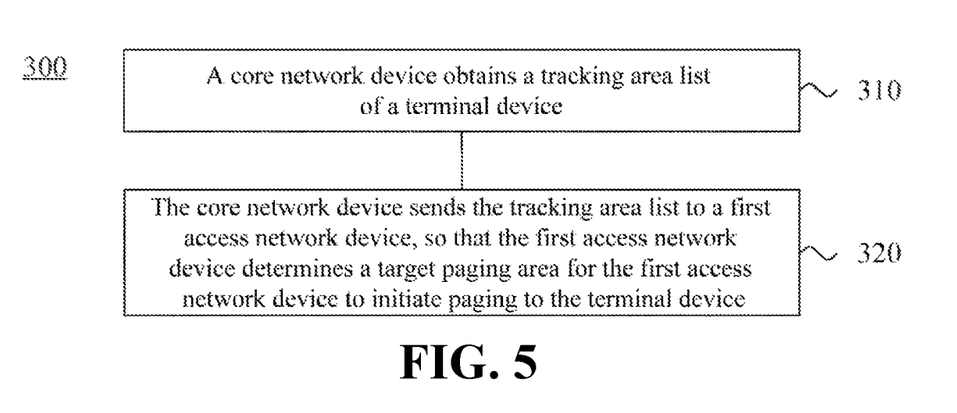
FIG. 5 shows yet another schematic block diagram of a method for paging according to an implementation of the present disclosure.

FIG. 5 shows a schematic block diagram of a method 300 for paging according to an implementation of the present disclosure. As shown in FIG. 5, the method 300 includes part or all of the following contents.

S310, a core network device obtains a tracking area list of a terminal device; and S320, the core network device sends the tracking area list to a first access network device, so that the first access network device determines a target paging area for the first access network device to initiate paging to the terminal device.

Therefore, in the method for paging according to the implementation of the present disclosure, the core network device enables the access network device to determine a suitable paging area for RAN paging by reporting the TA list, so that it is beneficial to reducing signaling overhead.

Optionally, in the implementation of the present disclosure, before the core network device sends the tracking area list to the first access network device, the method further includes: the core network device receives information for obtaining the tracking area list sent by the first access network device.

It should be understood that the interaction between the core network device and the access network device and the related characteristics, functions, or the like described for the core network device correspond to the related characteristics and functions of the access network device. In other words, what information the core network device sends to the access network device is what information the access network device receives accordingly. For sake of conciseness, the specific description will not be repeated here.

It should be understood that in various implementations of the present invention, values of sequence numbers in the aforementioned processes do not indicate an order of execution, and the order of execution of various processes should be determined by their functions and internal logics, and should not constitute any limitation on implementation processes of implementations of the present disclosure.

The method for paging according to implementations of the present invention has been described in detail above. An apparatus for paging according to implementations of the present invention will be described below with reference to FIGS. 6 to 11. The technical features described in the method implementations are applicable to the following apparatus implementations.

Figure 6:
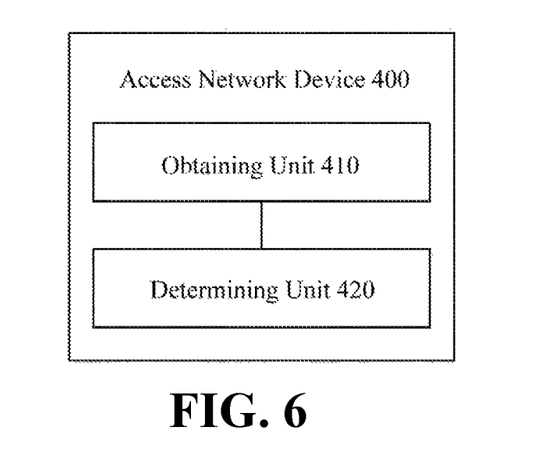
FIG. 6 shows a schematic block diagram of an access network device according to an implementation of the present disclosure.

FIG. 6 shows a schematic block diagram of an access network device 400 according to an implementation of the present disclosure. The access network device is a first access network device. As shown in FIG. 6, the access network device 400 includes: an obtaining unit 410, configured to obtain a tracking area list of a terminal device; and a determining unit 420, configured to determine, according to the tracking area list, a target paging area for the first access network device to initiate paging to the terminal device.

Therefore, the access network device according to the implementation of the present disclosure may refer to the TA list of the terminal device to determine a suitable paging area for RAN paging, so that it is beneficial to reducing signaling overhead.

Optionally, in the implementation of the present disclosure, the access network device further includes: a paging unit, configured to initiate paging to the terminal device within the target paging area when there exists downlink data of the terminal device which needs to be sent.

Optionally, in the implementation of the present disclosure, the paging unit is specifically configured to initiate paging to the terminal device within the target paging area, when the terminal device is in a Radio Resource Control (RRC) inactive state and there exists the downlink data which needs to be sent.

Optionally, in the implementation of the present disclosure, the obtaining unit is specifically configured to receive the tracking area list sent by the terminal device and/or the core network device.

Optionally, in the implementation of the present disclosure, the access network device further includes: a first sending unit, configured to send a request for obtaining the tracking area list to the terminal device and/or the core network device.

Optionally, in the implementation of the present disclosure, the obtaining unit is specifically configured to receive the tracking area list obtained by the terminal device, once the terminal device performs tracking area update or an attachment process.

Optionally, in the implementation of the present disclosure, the obtaining unit is specifically configured to receive the tracking area list obtained by the terminal device through RRC signaling.

Optionally, in the implementation of the present disclosure, the obtaining unit is specifically configured to receive the tracking area list sent by a second access network device, when the access network device which provides a network service for the terminal device switches from the second access network device to the first access network device.

Optionally, in the implementation of the present disclosure, the tracking area list is carried in context information of the terminal device.

Optionally, in the implementation of the present disclosure, the access network device further includes: a second sending unit, configured to send information of the target paging area to the terminal device so that the terminal device triggers the first access network device to reconfigure a paging area for the terminal device when the terminal device determines to move out of the target paging area.

It should be understood that the access network device 400 according to the implementation of the present disclosure may correspond to the first access network device in the method implementations of the present disclosure, and the above and other operations and/or functions of various units in the access network device 400 are respectively for realizing the corresponding processes of the first access network device in the method of FIG. 2, and will not be repeated here for the sake of brevity.

Figure 7:
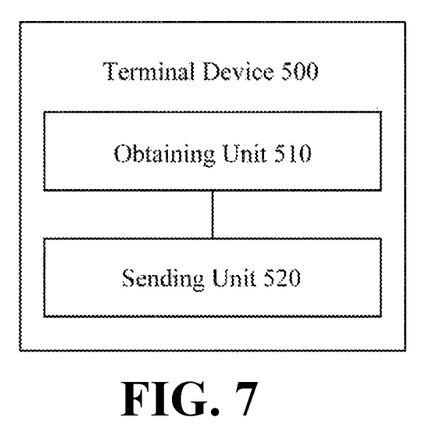
FIG. 7 shows a schematic block diagram of a terminal device according to an implementation of the present disclosure.

FIG. 7 shows a schematic block diagram of a terminal device 500 according to an implementation of the present disclosure. As shown in FIG. 7, the terminal device 500 includes: an obtaining unit 510, configured to obtain a tracking area list of the terminal device; and a sending unit 520, configured to send the tracking area list to a first access network device, so that the first access network device determines a target paging area for the first access network device to initiate paging to the terminal device.

Therefore, the terminal device according to the implementation of the present disclosure enables the access network device to determine a suitable paging area for RAN paging by reporting the TA list, so that it is beneficial to reducing signaling overhead.

Optionally, in the implementation of the present disclosure, the obtaining unit is specifically configured to obtain the tracking area list during tracking area update or an attaching process.

Optionally, in the implementation of the present disclosure, the terminal device further includes: a first receiving unit, configured to receive a request for obtaining the tracking area list sent by the first access network device.

Optionally, in the implementation of the present disclosure, the sending unit is specifically configured to send the tracking area list to the first access network device, once the terminal device obtains the tracking area list.

Optionally, in the implementation of the present disclosure, the sending unit is specifically configured to send the tracking area list to the first access network device through Radio Resource Control (RRC) signaling.

Optionally, in the implementation of the present disclosure, the terminal device further includes: a second receiving unit, configured to receive a paging message sent by the first access network device, when the terminal device is in an RRC inactive state, wherein the paging message is used for indicating that there exists downlink data of the terminal device which needs to be sent.

Optionally, in the implementation of the present disclosure, the terminal device further includes: a third receiving unit, configured to receive information of the target paging area sent by the first access network device; and a triggering unit, configured to trigger, according to the information of the target paging area, the first access network device to reconfigure a paging area to the terminal device.

It should be understood that the terminal device 500 according to the implementation of the present disclosure may correspond to the terminal device in the method implementations of the present disclosure, and the above and other operations and/or functions of various units in the terminal device 500 are respectively for realizing the corresponding processes of the terminal device in the method of FIG. 4, and will not be repeated here for the sake of brevity.

Figure 8:
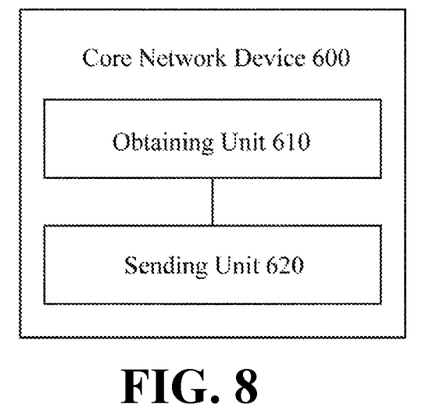
FIG. 8 shows a schematic block diagram of a core network device according to an implementation of the present disclosure.

FIG. 8 shows a schematic block diagram of a core network device 600 according to an implementation of the present disclosure. As shown in FIG. 8, the core network device 600 includes: an obtaining unit 610, configured to obtain a tracking area list of a terminal device; and a sending unit 620, configured to send the tracking area list to a first access network device, so that the first access network device determines a target paging area in which the first access network device initiates paging to the terminal device.

Therefore, the core network device of the implementation of the present disclosure enables the access network device to determine a suitable paging area for RAN paging by reporting the TA list, so that it is beneficial to reducing signaling overhead.

Optionally, in the implementation of the present disclosure, the core network device further includes: a receiving unit, configured to receive information for obtaining the tracking area list sent by the first access network device.

It should be understood that the core network device 600 according to the implementation of the present disclosure may correspond to the core network device in the method implementations of the present disclosure, and the above and other operations and/or functions of various units in the core network device 600 are respectively for realizing the corresponding processes of the core network device in the method of FIG. 5, and will not be repeated here for the sake of brevity.

Figure 9:
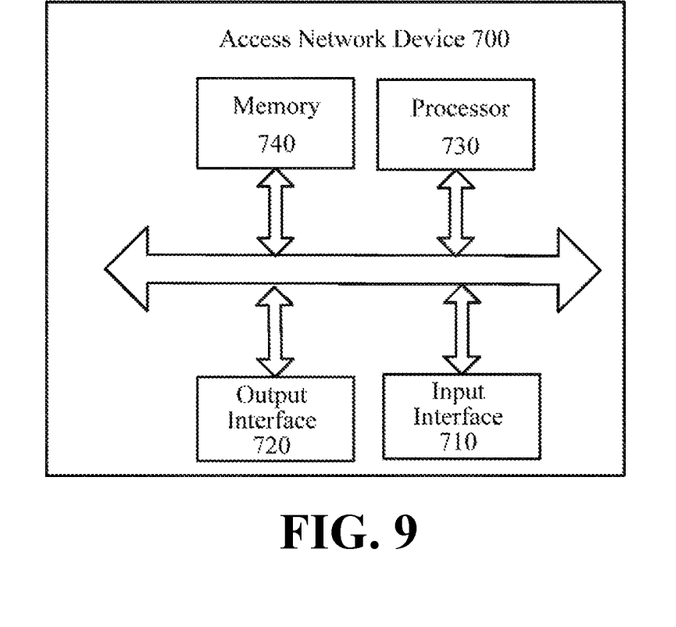
FIG. 9 shows another schematic block diagram of an access network device according to an implementation of the present disclosure.

As shown in FIG. 9, implementations of the present disclosure also provide an access network device 700, wherein the access network device 700 may be the access network device 400 in FIG. 6, which may be configured to perform the contents of the first access network device corresponding to the method 100 of FIG. 2. The access network device 700 includes: an input interface 710, an output interface 720, a processor 730, and a memory 740, wherein the input interface 710, the output interface 720, the processor 730, and the memory 740 may be connected through a bus system. The memory 740 is configured to store programs, instructions, or codes. The processor 730 is configured to execute the programs, the instructions, or the codes in the memory 740 to control the input interface 710 to receive signals, to control the output interface 720 to send signals, and to complete the operations in the aforementioned method implementations.

Therefore, the access network device of the implementation of the present disclosure may refer to the TA list of the terminal device to determine a suitable paging area for RAN paging, so that it is beneficial to reducing signaling overhead.

It should be understood that in the implementation of the present disclosure, the processor 730 may be a Central Processing Unit (CPU), or the processor 730 may be another general purpose processor, a Digital Signal Processor (DSP), an Application Specific Integrated Circuit (ASIC), a Field Programmable Gate Array (FPGA), or another programmable logic device, discrete gate or transistor logic device, or discrete hardware component, or the like. The general purpose processor may be a microprocessor or the processor may be any conventional processor or the like.

The memory 740 may include a read only memory and a random access memory, and provide instructions and data to the processor 730. A portion of memory 740 may include non-volatile random access memory. For example, the memory 740 may also store type information of a device.

In implementation processes, various acts of the methods described above may be accomplished by integrated logic circuits of hardware or instructions in the form of software in the processor 730. The acts of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 740, and the processor 730 reads the information in the memory 740, and accomplishes the contents of the above method in combination with its hardware. In order to avoid repetition, it will not be described in detail here.

In a specific implementation, the paging unit, the first sending unit and the second sending unit of the access network device 400 may be implemented by the output interface 720 in FIG. 9, and the obtaining unit and the determining unit of the access network device 400 may be implemented by the processor 730 in FIG. 9.

Figure 10:
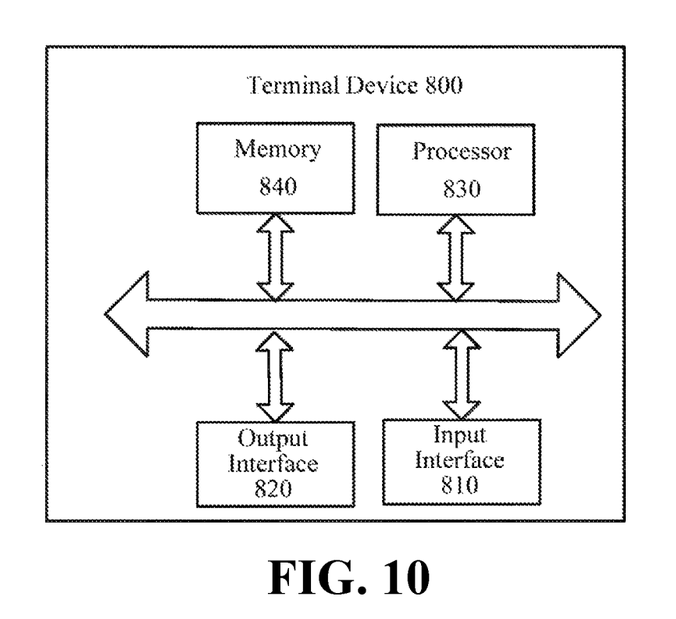
FIG. 10 shows another schematic block diagram of a terminal device according to an implementation of the present disclosure.

As shown in FIG. 10, implementations of the present disclosure also provide a terminal device 800, wherein, the terminal device 800 may be the terminal device 500 in FIG. 7, which may be configured to perform the contents of the terminal device corresponding to the method 200 of FIG. 4. The terminal device 800 includes an input interface 810, an output interface 820, a processor 830, and a memory 840. The input interface 810, the output interface 820, the processor 830, and the memory 840 may be connected through a bus system. The memory 840 is configured to store programs, instructions, or codes. The processor 830 is configured to execute the programs, the instructions, or the codes in the memory 840 to control the input interface 810 to receive signals, to control the output interface 820 to send signals, and to complete the operations in the aforementioned method implementations.

Therefore, the terminal device of the implementation of the present disclosure enables the access network device to determine a suitable paging area for RAN paging by reporting the TA list, so that it is beneficial to reducing signaling overhead.

It should be understood that in the implementation of the present disclosure, the processor 830 may be a Central Processing Unit (CPU), or the processor 830 may be another general purpose processor, a Digital Signal Processor (DSP), an Application Specific Integrated Circuit (ASIC), a Field Programmable Gate Array (FPGA), or another programmable logic device, discrete gate or transistor logic device, or discrete hardware component, or the like. The general purpose processor may be a microprocessor or the processor may be any conventional processor or the like.

The memory 840 may include a read only memory and a random access memory, and provide instructions and data to the processor 830. A portion of memory 840 may include non-volatile random access memory. For example, the memory 840 may also store type information of a device.

In implementation processes, various acts of the methods described above may be accomplished by integrated logic circuits of hardware or instructions in the form of software in the processor 830. The acts of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 840, and the processor 830 reads the information in the memory 840, and accomplishes the contents of the above method in combination with its hardware. In order to avoid repetition, it will not be described in detail here.

In a specific implementation, the sending unit of the terminal device 500 may be implemented by the output interface 820 in FIG. 10, and the first receiving unit to the third receiving unit of the terminal device 500 may be implemented by the input interface 810 in FIG. 10. The obtaining unit and the triggering unit of the terminal device 500 may be implemented by the processor 830 in FIG. 10.

Figure 11:
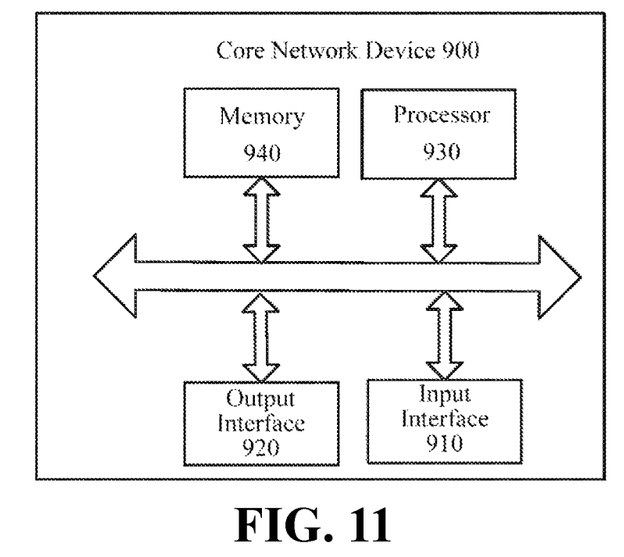
FIG. 11 shows another schematic block diagram of a core network device of an implementation of the present disclosure.

As shown in FIG. 11, implementations of the present disclosure also provide a core network device 900, wherein the core network device 900 may be the core network device 600 in FIG. 8, which may be configured to execute the contents of the core network device corresponding to the method 300 in FIG. 5. The core network device 900 includes: an input interface 910, an output interface 920, a processor 930, and a memory 940, wherein the input interface 910, the output interface 920, the processor 930, and the memory 940 may be connected through a bus system. The memory 940 is configured to store programs, instructions, or codes. The processor 930 is configured to execute the programs, the instructions, or the codes in the memory 940 to control the input interface 910 to receive signals, to control the output interface 920 to send signals, and to complete the operations in the aforementioned method implementations.

Therefore, the core network device of the implementation of the present disclosure enables the access network device to determine a suitable paging area for RAN paging by reporting the TA list, so that it is beneficial to reducing signaling overhead.

It should be understood that in the implementation of the present disclosure, the processor 930 may be a Central Processing Unit (CPU), or the processor 930 may be another general purpose processor, a Digital Signal Processor (DSP), an Application Specific Integrated Circuit (ASIC), a Field Programmable Gate Array (FPGA), or another programmable logic device, discrete gate or transistor logic device, or discrete hardware component, or the like. The general purpose processor may be a microprocessor or the processor may be any conventional processor or the like.

The memory 940 may include a read only memory and a random access memory, and provide instructions and data to the processor 930. A portion of memory 940 may include non-volatile random access memory. For example, the memory 940 may also store type information of a device.

In implementation processes, various acts of the methods described above may be accomplished by integrated logic circuits of hardware or instructions in the form of software in the processor 930. The acts of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 940, and the processor 930 reads the information in the memory 940, and accomplishes the contents of the above method in combination with its hardware. In order to avoid repetition, it will not be described in detail here.

In a specific implementation, the sending unit in the core network device 600 may be implemented by the output interface 920 in FIG. 11, and the receiving unit in the core network device 600 may be implemented by the input interface 910 in FIG. 11. The obtaining unit in the core network device 600 may be implemented by the processor 930 in FIG. 11.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed system, apparatus and method may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the prior art, or the part of the technical solution, may be embodied in the form of a software product stored in a storage medium, including several instructions for causing a computer device (which may be a personal computer, a server, or a network device, etc.) to perform all or part of the acts of the various implementations of the present disclosure. The aforementioned storage medium includes various media capable of storing program codes, such as a U disk, a mobile hard disk, a read-only memory (ROM), a random access memory (RAM), a magnetic disk, or an optical disk.

The aforementioned are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure shall be the protection scope defined by the claims.

What is claimed is:

1. A method for paging, comprising:
   obtaining, by a first access network device, a tracking area list of a terminal device;
   determining, by the first access network device according to the tracking area list, a target paging area for the first access network device to initiate paging to the terminal device; and
   when the terminal device is in a Radio Resource Control (RRC) inactive state and downlink data exists that needs to be sent, initiating, by the first access network device, paging to the terminal device within the target paging area,
   wherein the tracking area list is carried in context information of the terminal device, and
   wherein obtaining, by the first access network device, the tracking area list of the terminal device comprises:
      receiving, by the first access network device, the tracking area list sent by a core network device, and
   wherein the method further comprises:
      sending, by the first access network device, information of the target paging area to the terminal device, to enable the terminal device to trigger the first access network device to reconfigure a paging area for the terminal device when the terminal device determines that the terminal device has moved out of the target paging area.

2. The method according to claim 1, wherein before receiving, by the first access network device, the tracking area list sent by the core network device, the method further comprises:
   sending, by the first access network device, a request for obtaining the tracking area list to the core network device.

3. The method according to claim 1, wherein the obtaining, by the first access network device, the tracking area list of the terminal device, comprises:
   receiving, by the first access network device, the tracking area list sent by a second access network device, when an access network device which provides a network service for the terminal device switches from the second access network device to the first access network device.

4. A access network device, comprising a memory, a processor, an input interface, and an output interface, wherein the memory, the processor, the input interface and the output interface are connected through a bus system, the memory is configured to store instructions, and the processor is configured to execute the instructions stored in the memory to:
   obtain a tracking area list of a terminal device;
   determine, according to the tracking area list, a target paging area to initiate paging to the terminal device; and
   when the terminal device is in a Radio Resource Control (RRC) inactive state and downlink data exists that needs to be sent, initiate paging to the terminal device within the target paging area,
   receive the tracking area list sent by a core network device; wherein the tracking area list is carried in context information of the terminal device; and
   send information of the target paging area to the terminal device, to enable the terminal device to trigger the access network device to reconfigure a paging area for the terminal device when the terminal device determines that the terminal device has moved out of the target paging area.

* * * * *